US00RE34569E

United States Patent [19]

Sartorio

[11] E Patent Number: Re. 34,569

[45] Reissued Date of Patent: Mar. 29, 1994

[54] ROBOTIZED HANDLING DEVICE AND SHEET METAL BENDING SYSTEM FEATURING THE SAME

[75] Inventor: Franco Sartorio, Turin, Italy

[73] Assignee: Amada Company, Limited, Japan

[21] Appl. No.: 911,802

[22] Filed: Jul. 10, 1992

Related U.S. Patent Documents

Reissue of:

[64] Patent No.: 4,827,757
Issued: May 9, 1989
Appl. No.: 135,308
Filed: Dec. 21, 1987

U.S. Applications:

[63] Continuation of Ser. No. 696,936, May 8, 1991, abandoned.

[30] Foreign Application Priority Data

Dec. 30, 1986 [IT] Italy ..... 67980A/86

[51] Int. Cl.[5] ..... B21D 11/22

[52] U.S. Cl. ..... 72/420; 72/461

[58] Field of Search ..... 72/361, 420

[56] References Cited

U.S. PATENT DOCUMENTS 2,609,776 9/1952 Shalin .
3,633,088 1/1972 Kupersmith ..... 318/626
4,501,522 2/1985 Causer et al. ..... 414/735
4,557,135 12/1985 Ragettli et al. ..... 72/422
5,058,406 10/1991 Sartorio et al. .
5,182,936 2/1993 Sartorio .

FOREIGN PATENT DOCUMENTS 3407445 12/1985 Fed. Rep. of Germany .
78725 5/1984 Japan .
97722 6/1984 Japan .
59-227379 12/1984 Japan .
2177676 1/1987 United Kingdom .

*Primary Examiner*—Lowell A. Larson
*Attorney, Agent, or Firm*—Wigman, Cohen, Leitner & Myers

[57] ABSTRACT

A one-armed handling device having a single pick-up member designed to secure a metal sheet coplanar to a pick-up plane through the aforementioned pick-up member; which member is supported on a head so as to turn about two perpendicular axes by virtue of a first element designed to turn about a first axis perpendicular to the pick-up plane, and to which the pick-up member is secured directly, and a second element designed to turn about a second axis parallel with the pick-up plane and supporting the first element; the aforementioned head, in turn, being designed to travel along three cartesian axes, by means of an arm, with no variation in the position of the second axis (FIG. 1).

16 Claims, 3 Drawing Sheets

ROBOTIZED HANDLING DEVICE AND SHEET METAL BENDING SYSTEM FEATURING THE SAME

Matter enclosed in heavy brackets [ ] appears in the original patent but forms no part of this reissue specification; matter printed in italics indicates the additions made by reissue.

This is a continuation of co-pending Ser. No. 07/696,936 filed on May 8, 1991, now abandoned.

BACKGROUND OF THE INVENTION

The present invention relates to a robotized, numerical control handling device, especilly suitable for handling different-sized metal sheets for bending. In particular, the present invention relates to a handling device suitable for use as an integral part of an automated sheet metal bending press system, and to the bending system as a whole.

All known handling devices present a physical structure poorly suited to handling metal sheets varying considerably in size. The reason for this is that they usually comprise a single extendable rotary arm to which is fitted a frame having a number of pick-up devices, usually magnetic (magnets) or pneumatic (suckers). Handling devices of the aforementioned type present a number of drawbacks; performance is limited by the said frame; the device itself is highly cumbersome; and the pick-up member must be changed for handling different-sized sheets.

SUMMARY OF THE INVENTION

The aim of the present invention is to provide a handling device that is straightforward in design, cheap to produce, compact, and provides for efficient handling of different-sized sheets, and the use of mechanical pickup members.

With this aim in view, according to the present invention, there is provided a robotized, numerical control handling device comprising a pick-up member designed to cooperate with a metal sheet in such a manner as to secure it coplanar to a pick-up plant through the said pick-up member; and means for selectively moving the said pick-up member into a number of different positions, in particular, for automatically bending sheet metal on a bending press; charaterised by the fact that is comprises; a head supporting the said pick-up member and enabling rotation of the same about two perpendicular axes; and respective supporting members for the said head, designed to move the same, in controlled manner and in relation to a reference system, along three cartesian axes; the said head comprising a first powered element directly supporting the said pick-up member and connected rigidly integral with the same, said first element being mounted for rotation about a first of the said perpendicular axes, perpendicular to the said pick-up plane; and a second powered element supporting, in rotary manner, the said first powered element and, in turn, mounted integrally on the said supporting members so as to turn about a second of the said perpendicular axes, parallel with the said pickup plane; the said supporting members being designed to shift the said second axis with no change in its position in relation to the said reference system.

BRIEF DESCRIPTION OF THE DRAWINGS

A non-limiting embodiment of the present invention will be described by way of example, with reference to the accompanying drawings, in which.

DETAILED DESCRIPTION OF THE INVENTION

Figure 1:
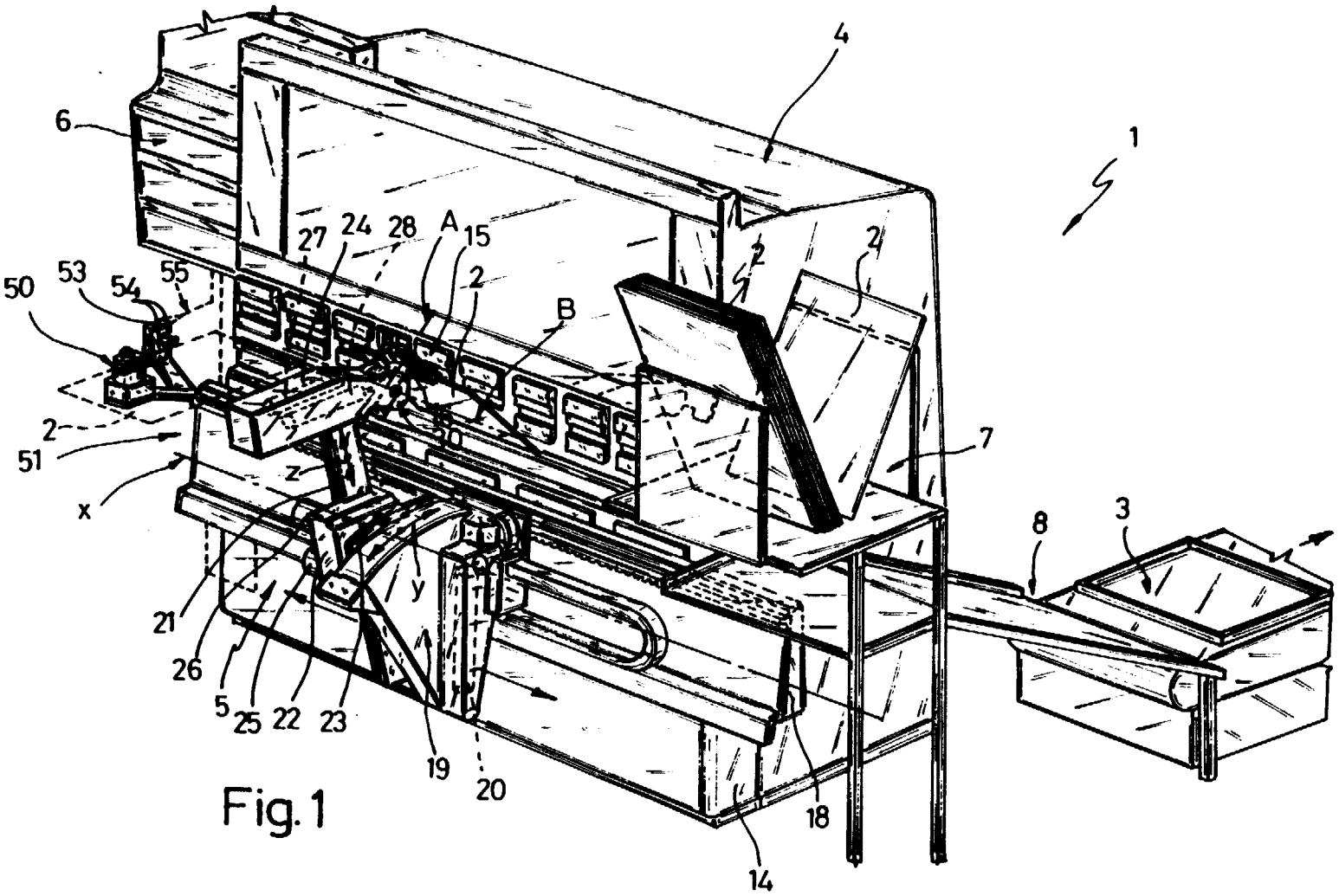
FIG. 1 shows a view in perspective of a handling device in accordance with the teachings of the present invention, and a sheet metal bending system featuring such a device.
Figure 4:
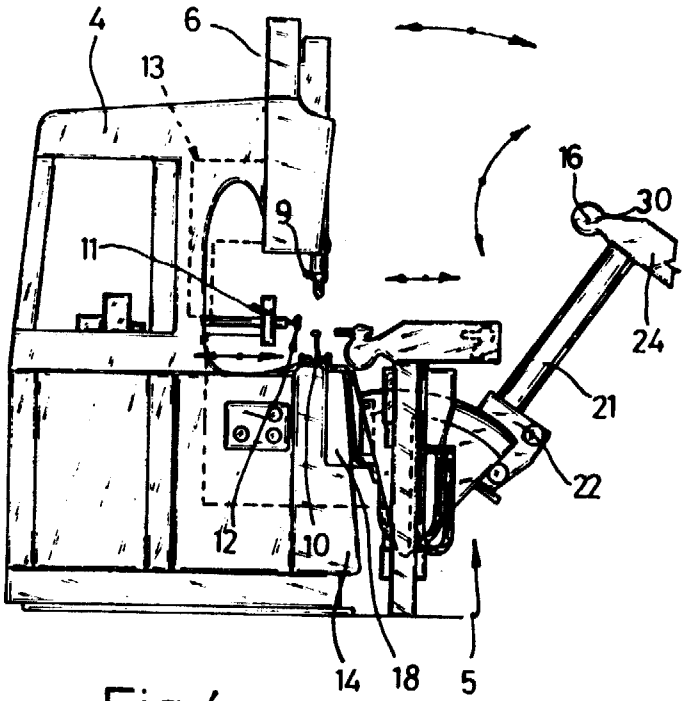
FIG. 4 shows a side view of the FIG. 1 device and system.
Figure 5:
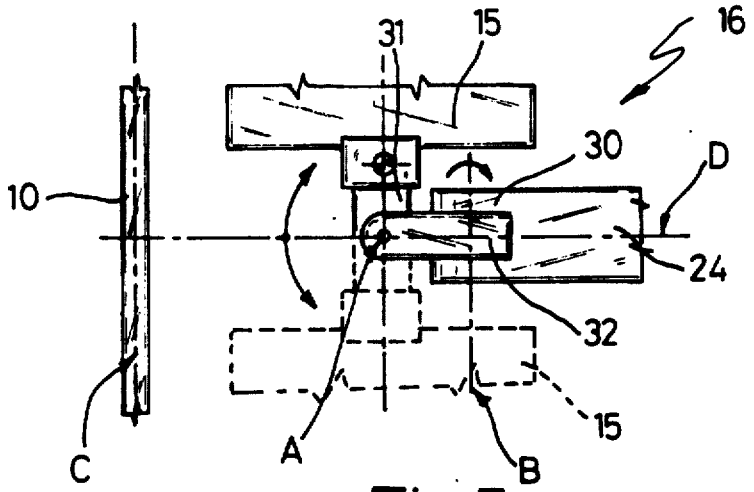
FIGS 5, 6, 7, 8 and 9 show schematic operating diagrams of the FIG. 1 device.

No. 1 in FIGS. 1 and 4 indicates an automated system for bending metal sheets 2, particularly, though not exclusively, for producing boxes 3. System 1 comprises a bending press 4 of any known type; a robotized handling device 5 controlled by a known e.g. microprocessor, electronic system 6; a store 7 for sheets 2; and an unloading and transfer device 8 for finished boxes 3. Press 4 comprises a punch 9 and a die 10, arranged facing and parallel with each other, and designed to mate in such a manner as to bend a sheet 2 placed between the said punch 9 and die 10 (FIGS. 6 and 7) along a straight axis C (FIG. 5) parallel with the longitudinal axis of press 4, and hereinfafter referred to also as the "bend axis". Behind bend axis C in relation to device 5, and opposite the said device 5, press 4 also present a mobile, numerical control back gauge 11 of substantially known type, controlled by system 6 or similar, and fitted integral with press 4 for cooperating with and determining the position of sheet 2. According to the present invention, however, back gauge 11 presents at least one pair of linear position transducers 12 of any known type (potentiometer, optical scale, etc.) having a relatively long measuring range (measurable in centimeters) and designed to cooperate with sheet 2 being handled by device 5, for detecting the position of the said sheet 2 in relation to bend axis C, and consequently supplying system 6, e.g. over line 13, with a control signal enabling system 6 to correct the position of sheet 2 by appropriately controlling device 5. Also according to the present invention, the said device 5 is mounted directly on and integral with press 4, in particular, on a bed element 14 of the same, parallel with the axis C, so as to provide for the necessary structural rigidity of device 5 by exploiting the weight of press 4 itself. Depending on the type of press 4 (mobile punch or mobile die), element 14 may form part of the bed of press 4, in which case device 5 is fixed in relation to punch 9; or it may form part of a mobile structure supporting die 10, in which case, during operation of press 4, device 5 is raised, together with element 14 and die 10, towards fixed punch 9.

Figure 2:
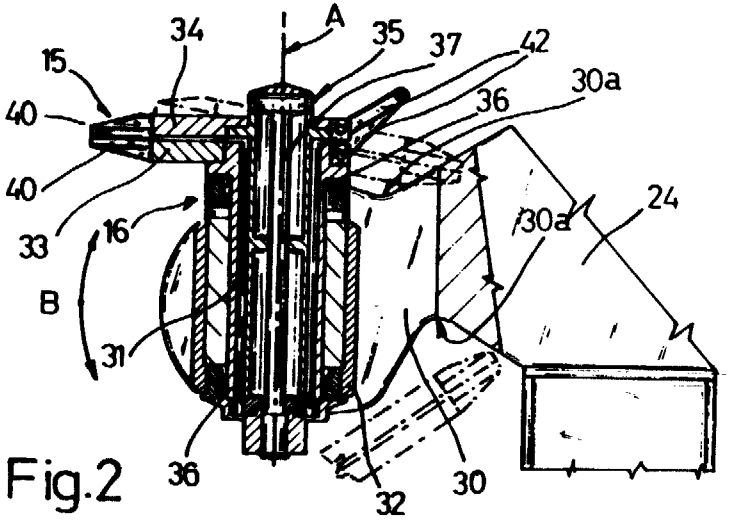
FIGS. 2 and 3 show a larger-scale, partially-sectioned elevation and plan view respectively of a detail on the FIG. 1 device.
Figure 3:
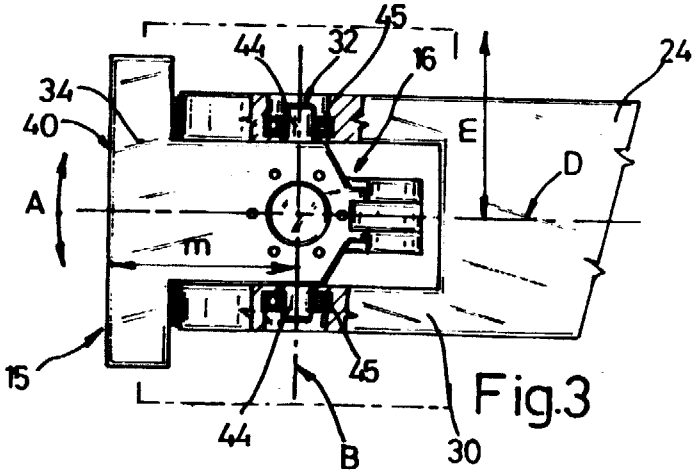

Device 5 is a one-armed device comprising a pick-up member 15 of any type designed to cooperate with a single sheet 2 for securing the same coplanar to a pick-up plane through the said pick-up member 15, and so forcing the said sheet 2 to travel rigidly integral with and substantially coplanar to the said pick-up member 15; a head 16 integrally supporting the said pick-up member 15 and enabling rotation of the same about two perpendicular axes A and B (FIGS. 1, 2 and 3); and supporting members of head 16, designed to move the same, in relation to a reference system the coordinates of which are memorised in system 6 and which is fixed in relation to axis C, along three caresian axes, in particular, along an axis X parallel with axis C and located a given fixed distance from the same; and in a plane perpendicular to axis X, in the example shown, according to a polar reference Y, Z.

The said members supporting head 16 comprise a straight preferably U-section base 18 secured integral with element 14, with its longitudinal axis parallel and coincident with the said X axis; a known type of powered carriage 19, e.g. powered by a first step motor 20 having an encoder or other similar position transducer, and designed to travel along base 18 in the X axis direction; a straight column 21 supported on a second powered carriage 22 designed to travel on the said carriage 19, along a sector gear 23, over a curved trajectory Y perpendicular to the traveling direction of carriage 19 by virtue of lying in a plane perpendicular to the said X axis; and a straight arm 24 secured across the top of column 21, perpendicular to base 18 and to the X axis traveling direction of carriage 19. Carriage 22 is powered, for example, by a step motor 25 having a respective encoder; and column 21, in turn, powered, for example by a further step motor 26 having a respective encoder, travels along its longitudinal axis on carriage 22, in direction Z perpendicular to and lying in the same plane as direction Y, and therefore also perpendicular to the said X axis and the traveling direction of carriage 19.

Arm 24 presents a further two motors and position transducers, 27 and 28, for head 16, and an end fork 30 supporting the said head 16. According to the present invention, head 16 comprises a first element 31 directly supporting a connected rigidly integral with member 15; and a second element 32 directly supporting element 31, but disconnected from member 15, and, in turn, supported on end fork 30 inside which it is housed together with the rest of head 16. Element 31 is powered in known manner (not shown) by motor 27, and mounted on element 32 so as to turn about axis A, whereas element 32 is powered in known manner (not shown) by motor 28, and mounted on end 30 so as to turn about axis B. According to the present invention, elements 31 and 32 are fitted crosswise one inside the other, with their respective axes of rotation A and B intersecting; the said axes A and B, with which elements 31 and 32 rotate coaxially, being arranged respectively perpendicular and parallel to the said sheet 2 pick-up plane. In other words, head 16 is constructed in such a manner that axis A is perpendicular to the plane of pick-up member 15 and to sheet 2 being secured by the same, whereas axis B is parallel and substantially coplanar to the said sheet 2. The rotation axis B of element 32 is also located parallel with axis X, and strictly parallel with punch 9 and, therefore, also axis C. By virtur of the said structure of the members supporting head 16, it also follows that, however device 5 is operated, i.e. moving carriages 19 and 22 and column 21 singly or together in any direction, axis B moves together with head 16, with no change in its position in relation to the said reference system stored in system 6 and fixed in relation to axis C. That is to say, axis B always remains parallel with bend axis C on press 4 to which handling device 5 is connected.

According to the present invention, pick-up member 15 consists of a mechanaical grip comprising a pair of parallel, opposed jaws 33 and 34 having a T-shaped horizontal section; and a known type of linear actuator 35, preferably hydraulic or pneumatic, designed to move jaws 33 and 44 perpendicular to their respective planes and along its own axis of symmetry. Actuator 35 is arranged with its axis coinciding with rotation axis A and, for reasons of size, preferably consists of a pair of air-powered cylinders arranged in series. Jaw 33 is mounted integral with element 31, which consists of a cylindrical sleeve mounted inside element 32, so as to turn about axis A on bearings 36. Jaw 34, on the other hand is mounted integral with a rod 37 on actuator 35, which rod 37 is, in turn, mounted idly and coaxially inside sleeve 31. To prevent accidental rotation, jaws 33 and 34 are hinged together, on the end opposite pick-up edges 40, by a pair of connecting rods 42 hinged together and to the said jaws 33 and 34. Element 32 is, in turn hinged coaxially with axis B on arm 24, by means of pins 44 mounted idly on respective bearings 45. Arm 24 is substantially parallelepiped and summetrical in relation to an axis D (FIG. 3) intersection axes A and B at the same point, so as to enable element 31, and pick-up member 15 integral with it, to turn through an arc symmetrically in relation to a plane perpendicular to bend axis C and, in particular, symmetrical in relation to axis D. According to the present invention, for enabling efficient, interference-free handling of sheets 2, element 32 must be allowed to turn about axis B through a minimum arc of 235°; while, at the same time, element 31 must be allowed to turn about axis A through an arc of over 180°. Such is provided for by tapering arm 24 in the proximity of end fork 30 which, in the plane perpendicular to axis B, is defined by opposed cavities 30a (FIG. 2) designed to receive pick-up member 15 in its two limit positions about axis B and as shown by the hatching in FIG. 2. Furthermore, column 21 is formed narrower than arm 24; and the whole of device 5 is formed in such a manner as to be smaller, at least on one side, than the width of arm 24 measured perpendicular to axis D. Vice versas, symmetrical T-shaped jaws 33 and 34 are formed in such a manner that, when viewed horizontally in a plane perpendicular to axis A (FIG. 3), the widest end having pick-up edge 40 is separated from rotation axis A by a distance "m" greater than half the width of arm 24 measured crosswise in relation to axis D, so that the said end projects laterally in relation to arm 24 when pick-up member 15 is turned perpendicular to axis D, thus preventing interference with arm 24 regardless of whether pick-up member 15 is loaded or not. Sheet 2 may thus be freely turned over 180° by turning pick-up member 15 about axis B, with pick-up member 15 arranged perpendicular to axis D (subsequent to 90° rotation about axis A).

Figure 6:
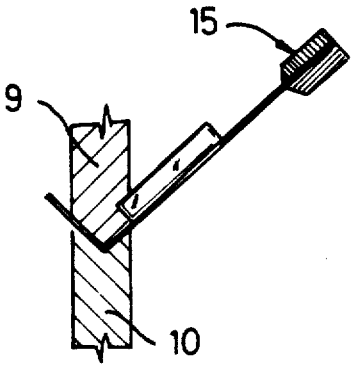
Figure 7:
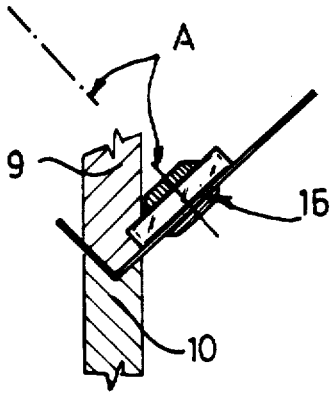
Figure 8:
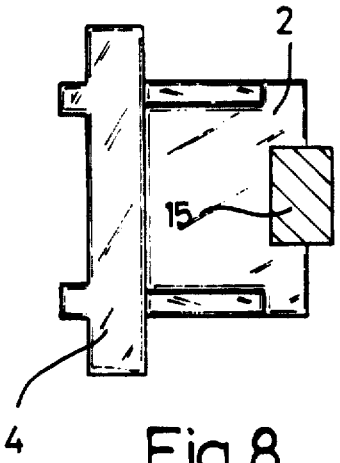
Figure 9:
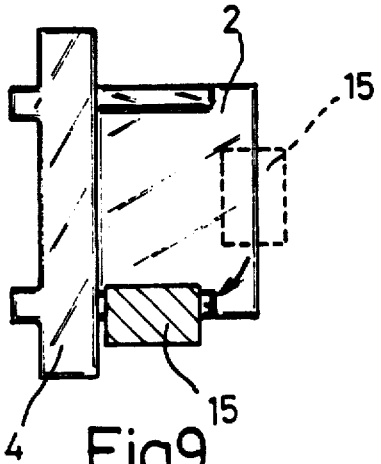

Handling device 5 optionally also comprises at least one auxiliary pick-up member 50 identical to member 15 and fitted integral with end 51 of base 18, in a given position, for gripping and sustaining sheet 2 held on pickup member 15. Close to the said auxiliary pick-up member 50, there is also provided a fixed lateral gauge 53 having at least one linear transducer 54 similar to transucers 12. Transducer 54 is also connected, over a line 55, to system 6, for supplying the said system 6 with a control signal for adjusting the position of device 5. When operated, device 5 withdraws sheets 2 one at a time from store 7 by gripping them in pick-up member 15, and moves them selectively into a number of different working positions in relation to axis C. In particular, as pickup member 15 is required to grip one of the longer sides of rectangular sheet 2, to prevent undue flexing, the short sides of sheet 2 on pick-up member 15 are first bent as shown in FIGS. 6 and 8. By turning pick-up member 15 about axis A, sheets 2 is then turned perpendicular to its plane, so as to present the long side, opposite the one gripped by pick-up member 15, between punch 9 and die 10. While the said long side is being gripped between punch 9 and die 10 (FIGS. 7 and 9), pick-up member 15 may be opened and turned again so as to grip the partially-bent sheet 2 by one of its short sides, thus freeing the last side for bending. When this is not possible, due to the small size of sheet 2, it is provided for automatically by device 5 using auxiliary pick-up member 50, on which sheet 2 is clamped during displacement of pick-up member 15. During displacement of pick-up member 15, positioning accuracy is maintained by device 5 setting sheet 2, regripped by pick-up member 15, against lateral gauge 53 and transducer 54, and, subsequently, against back gauge 11 and transducer 12, which, via system 6, supply control signals for correctly repositioning sheet 2, e.g. by turning pick-up member 15 about axis A and shifting carriage 22 and column 21. Furthermore, during each bending operation, pick-up member 15 provides for sustaining sheet 2 while at the same time following the oblique movement of the same induced by punch 9 and die 10, by opening and turning about axis B parallel with bend axis C. By turning pick-up member 15 about axis A into either of the limit positions shown in the plan view in FIG. 5, and then about axis B, sheet 2 may also be turned over 180° as already described.

The advantages of the present invention will be clear from the foregoing description. First and foremost, it provides for highly accurate positioning of sheet 2, thanks to numerical control displacement of device 5 and the use of transducers 12 and 54. Secondly, device 5 is cheaper and lighter than known devices, by virtue of being supported on part of the press itself. Thirdly, it provides for reducing the floor space, and facilitating transport and installation of the bending system as a whole. And finally, being provided with back gauge 11, the press on such a system may also be operated manually in the usual way, by simply shifting carriage 19 over to one end of base 18 so as to free the front of the press.

I Claim:

1. A robotized, numerical control handling device (5) comprising a pick-up member designed to cooperate with a metal sheet in such a manner as to secure it coplanar to a pick-up plane through the said pick-up member; and means for selectively moving the said pick-up member into a number of different positions, in particular, for automatically bending sheet metal on a bending press; characterised by the fact that it comprises: a head (16) supporting the said pick-up member (15) and enabling rotation of the same about two perpendicular axes (A, B); and supporting member (28, 29, 21, 24) for the said head, designed to move the same, in controlled manner and in relation to a reference system, along three caresian axes; the said head (16) comprising a first powered element (31) directly supporting the said pick-up member (15) and connected rigidly integral with the same, said first element (31) being mounted for rotation about a first (A) of the said perpendicular axes, perpendicular to the said pickup plane; and a second powered element (32) supporting, in rotarty manner, the said first powered element (31) and, in turn, mounted integrally on the said supporting member (18, 19, 21, 24) so as to turn about a second (B) of the said perpendicular axes, parallel with the said pick-up plane; the said supporting member (18, 19, 21, 24) being designed to shift the said second axis (B) with no change in its angular position in relation to the said reference system.

2. A device as claimed in claim 1, characterised by the fact that the said first and second elements (31, 32) on the said head (16) are fitted crosswise one inside the other, with their respective first (A) and second (B) axes of rotation intersecting.

3. A device as claimed in claim 1, characterised by the fact that the said pick-up member consists of a mechanical grip (15) comprising a pair of parallel, opposed jaws (33, 34), and a linear actuator (35) designed to move the said jaws (33, 34) along its own axis of symmetry; said linear actuator (35) being arranged with its said axis coincident with the said first axis of rotation (A).

4. A device as claimed in claim 3, characterized by the fact that one of the said jaws (33) is mounted integral with the said first element (31), which consists of a cylindrical sleeve mounted inside the said second element (32) and designed to turn about the said first axis (A), whereas the other said jaw (34) is mounted integral with a rod (37) on the said linear actuator (35), which rod (37) is mounted idly and coaxially inside the said sleeve (31); the said jaws (33, 34) being hinged together, on the end opposite their respective pick-up edges (40), by means of a pair of connecting rods (42) hinged together and to the said jaws (33, 34).

5. A device as claimed in claim 4, characterised by the fact that the said members supporting the said head (16) comprise a straight base (18); a powered carriage (19) designed to travel on the said base in a first straightline direction (X); a straight column (21) supported on a second powered carriage (22) traveling on the said first carriage (19) in a second direction (Y) perpendicular to the said first direction (X), and, in turn, designed to travel on the said second carriage (22) along its own longitudinal axis in a third direction (Z) perpendicular to both the said first and second directions (X, Y); and a straight arm (24) fitted crosswise on top of the said column (21), perpendicular to the said first direction (X) and supporting, on an end fork (30), the said second element (32) mounted for rotation about the said second axis of rotation (B) parallel with the said first direction (X).

6. A device as claimed in claim 5, characterised by the fact that the said column (21) is narrower than the said arm (24) supported on the same; and by the fact that the whole of the said device (5) is formed so as to be smaller, at least on one side, than the width of the said arm (24) measured perpendicular to the longitudinal axis (D) of the same; and the said jaws (33, 34) on the said pick-up member (15) being T-shaped and symmetrical, and having the widest end, with the said pick-up edge (40), separated from the said first axis (A) by a given distance (m) greater than half the width of the said arm (24) measured crosswise in relation to its longitudinal axis, so that the said end projects laterally in relation to the said arm (24), when the said pick-up member (15) is turned perpendicular to the longitudidnal axis of the said arm (24), by such an amount as to prevent interference with the said arm (24).

7. A decive as claimed in claim 5, characterised by the fact that it also comprises at least one auxiliary pick up member (50) fitted integral with one end of the said base (18), in a given position, for gripping the said sheet (2)

held on the said pick-up member (15) and sustaining it during at least part of the displacement of the said pick-up member (15).

8. A device as claimed in claim 5, characterised by the fact that the said second element (32) is designed to turn inside the said end fork (39) on the said arm (24) through a minimum arc of 235°; the said arm (24) being tapered in the proximity of the said end fork (30) which, in a plane perpendicular to the said second axis of rotation (B), is defined by opposed cavities (30a) designed to receive the said pick-up member (15) in its limit positions about the said second axis (B); the said first element (31) being designed to turn inside the said second element (32) and integral with the said pick-up member (15) through an arc of over 180° and symmetrical in relation to the longitudinal axis (D) of the said arm (24).

9. A device as claimed in claim 7, characterised by the fact that it also comprises at least one fixed lateral gauge (53) located in the proximity of the said auxillary pick-up member (50) and having at least one linear transducer (54) designed to cooperate with the said sheet (2) for detecting the position of the same; the said linear transducer (54) being connectable to an electronic system (6) for controlling operation of the said handling device (5).

10. A system for automatically bending metal sheets (2), said system comprising at least one bending press (4), and at least one robotized, numerical control handling device (5) as claimed in claim 1; characterised by the fact that the said robotized handling device (5) is fitted directly on and integral with the said press (4), on a bed element (14) of the same, with the said second head rotation axis (B) located strictly parallel with a punch (9) on the said press (4).

11. A system as claimed in claim 10, characterised by the fact that, on the said press (4), there is fitted, integral with the same, a back gauge (11) for positioning the said sheet (2), which gauge (11) is located opposite the said robotized handling device (5) and presents at least one pair of linear transducers (12) connected to the said electronic system (6) controlling the said device (5), and designed to cooperate with the said sheet (2) for detecting the position of the same and controlling the said system (6).

12. A system for automatically bending metal sheets, comprising:

(a) a bending press;
(b) at least a robotized, numerical control handling device;
(c) said device comprising a pick-up member designed to cooperate with a sheet metal in such a manner as to secure it coplanar to a pick-up plane through said pick-up member;
(d) means for selectively moving said pick-up member into a plurality of positions for automatically bending the sheet metal on said bending press;
(e) a head supporting said pick-up member and enabling rotation of said pick-up member about first and second mutally perpendicular axes;
(f) supporting members for said head, designed to move said head, in controlled manner and in relation to a reference system along three cartesian axes;
(g) said head comprising a first powered element directly supporting said pick-up member and connected rigidly integral with said pick-up member, said first element being mounted for rotation about said first axis perpendicular to said pick-up plane;
(h) a second powered element supporting, in rotary manner, said first powered element and, in turn, being mounted integrally on said supporting member so as to turn about said second axis parallel with said pick-up plane;
(i) said supporting members being designed to shift said second axis with no change in its angular position in relation to said reference system; and
(j) said device being fitted directly on and integral with said press on a bed element of said press, with said second axis of rotation of said head being located strictly parallel with a bend axis of said press.

13. A robotized, numerical controlled handling device for a work, comprising:

(a) a base;
(b) a carriage being mounted on said base and movable relative thereto along a horizontal axis;
(c) a column being mounted on said carriage having an upper and a lower end, said lower end having a pivot operably associated with said carriage, said column being pivotable along a plane transverse to said horizontal axis, said column having a longitudinal axis and movable long said longitudinal axis relative to said carriage and said base;
(d) an arm secured to said upper end of said column, said arm having front and rear ends, and said arm extending towards the work;
(e) a ahead being mounted at said front end of said arm, said head having a first axis of rotation and a second axis of rotation parallel to said horizontal axis and perpendicular to said first axis of rotation;
(f) a pick-up member being mounted on said head;
(g) first drive means for rotating said head about said first axis;
(h) second drive means for roatating said head about said second axis; and
(i) means for selectively moving said carriage and said column.

14. A system for automatically bending metal sheets, comprising:

(a) a bending press having a bend axis and a bed;
(b) a robotized numerical controlled handling device;
(c) said device including a base operably associated with said bed;
(d) said device including a carriage being mounted on said base and moveable relative thereto along a horizontal axis parallel to said bend axis;
(e) said device including a column being mounted on said carriage having a upper and lower end, said lower end having a pivot operably associated with said carriage, said column being pivotable along a plane transverse to said horizontal axis, said column having a longitudinal axis and moveable along said longitudinal axis relative to said carriage and said base;
(f) said device including an arm secured at said upper end of said column, said arm having front and rear ends, said arm extending towards the work;
(g) said device including a head being mounted at said front end of said arm, said head having a first axis of rotation and a second axis of rotation parallel to said horizontal axis and perpendicular to said first axis of rotation;
(h) said device including a pick-up member being mounted on said head;
(i) said device including first drive means for rotating said head about said first axis and second drive means for rotating said head about said second axis; and (j) said device including means for selectively moving said carriage and said column.

15. A robotized, numerical controlled handling device for a work, comprising:

(a) a pick-up member designed to cooperate with a sheet metal in such a manner as to secure it coplanar to a pick-up plane through said pick-up member;

(b) means for selectively moving said pick-up member into a plurality of positions for automatically bending the sheet metal on said bending press;

(c) a head supporting said pick-up member and enabling rotation of said pick-up member about first and second mutually perpendicular axes;

(d) supporting members for said head, designed to move said head, in controlled manner and in relation to a reference system along three cartesian axes;

(e) said head comprising a first powered element directly supporting said pick-up member and connected rigidly integral with said pick-up member, said first element being mounted for rotation about said first axis perpendicular to said pick-up plane;

(f) a second powered element supporting, in rotary manner, said first powered element and, in turn, being mounted integrally on said supporting members so as to turn about said second axis parallel with said pick-up plane;

(g) said supporting members being designed to shift said second axis with no change in its angular position in relation to said reference system;

(h) said members supporting said head including a straight base; and (i) at least one auxiliary pick-up member fitted integral with one end of said base, in a given position, for gripping said sheet held on said pick-up member and sustaining said sheet during at least part of the displacement of said pick-up member.

*16. A bending press system, comprising:*

*A bending press provided with a punch and a die extending in an X-axis direction, the punch and the die cooperating with each other for effecting a bending operation on a sheet workpiece provided therebetween;*

*a robotized handling device located in front of the punch and the die, for providing the workpiece between the punch and the die, the robotized handling device being adapted to be movable in the X-axis direction while gripping the sheet workpiece;*

*a lateral gauge means including a linear transducer having a relatively long measuring range and provided on a frame of the bending press, for detecting the sheet workpiece position at a predetermined position in the X-axis direction;*

*means for detecting a distance through which the robotized handling device is moved in the X-axis direction; and*

*control means connected to the lateral gauge means and the distance moved detecting means, for controlling the movement of the robotized handling device, the control means calculating the position of the X-axis direction of the workpiece, based upon signals from the lateral gauge means and the distance moved detecting means, and controlling the robotized handling device so as to position the sheet workpiece at a predetermined position in the X-axis direction with respect to the punch and the die.*

* * * * *

UNITED STATES PATENT AND TRADEMARK OFFICE

CERTIFICATE OF CORRECTION

PATENT NO. : Re. 34,569
DATED : March 29, 1994
INVENTOR(S) : Franco SARTORIO

It is certified that error appears in the above-indentified patent and that said Letters Patent is hereby corrected as shown below:

Column 5, line 58, "(28, 29, 21, 24)" should be --(18, 19, 21, 24)--;

line 61, "caresian" should be --cartesian--.

Claim 14, column 8, line 50, "a" should be --an--.

Claim 16, column 10, lines 9 and 10, "extending" should be --extended--.

line 29, "of the" should be --in the--.

Signed and Sealed this

Twenty-third Day of August, 1994

*Attest:*

*Attesting Officer*

Bruce Lehman

BRUCE LEHMAN

*Commissioner of Patents and Trademarks*